United States Patent
Wiebe

(10) Patent No.: US 9,617,862 B1
(45) Date of Patent: Apr. 11, 2017

(54) TRANSITION DUCT SYSTEM WITH STRAIGHT CERAMIC LINER FOR DELIVERING HOT-TEMPERATURE GASES IN A COMBUSTION TURBINE ENGINE

(71) Applicant: Siemens Energy, Inc., Orlando, FL (US)

(72) Inventor: David J. Wiebe, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 0 days.

(21) Appl. No.: 15/002,429

(22) Filed: Jan. 21, 2016

(51) Int. Cl.
F01D 9/02 (2006.01)
F23R 3/00 (2006.01)
F23R 3/42 (2006.01)

(52) U.S. Cl.
CPC .............. F01D 9/023 (2013.01); F23R 3/007 (2013.01); F23R 3/425 (2013.01)

(58) Field of Classification Search
CPC .. F01D 9/023; F23R 3/60; F23R 3/425; F23R 3/007; F23R 3/002; F23R 3/06; F23R 3/46
See application file for complete search history.

(56) References Cited

U.S. PATENT DOCUMENTS

| | | | |
|---|---|---|---|
| 4,030,875 A * | 6/1977 | Grondahl | F23C 3/00 60/753 |
| 4,380,896 A | 4/1983 | Wiebe | |
| 5,706,646 A * | 1/1998 | Wilde | F01D 9/023 60/39.37 |
| 6,397,603 B1 | 6/2002 | Edmondson et al. | |
| 6,412,268 B1 * | 7/2002 | Cromer | F01D 9/023 60/760 |
| 7,546,743 B2 | 6/2009 | Bulman et al. | |
| 8,276,389 B2 | 10/2012 | Charron et al. | |
| 8,667,682 B2 * | 3/2014 | Lee | F23R 3/46 29/890.01 |
| 9,127,565 B2 | 9/2015 | Keller et al. | |
| 2005/0211674 A1 * | 9/2005 | Holmes | F01D 9/023 216/108 |
| 2009/0260364 A1 * | 10/2009 | Keller | F01D 9/023 60/753 |
| 2010/0316492 A1 * | 12/2010 | Charron | F01D 9/023 415/182.1 |
| 2012/0121381 A1 * | 5/2012 | Charron | F01D 9/023 415/115 |
| 2012/0186254 A1 * | 7/2012 | Ito | B23K 1/0018 60/722 |
| 2012/0275900 A1 * | 11/2012 | Snider | F01D 9/023 415/108 |
| 2014/0010644 A1 | 1/2014 | Charron et al. | |

(Continued)

Primary Examiner — Carlos A Rivera

(57) ABSTRACT

A transition duct system (10) for delivering hot-temperature gases from a plurality of combustors in a combustion turbine engine is provided. The system includes an exit piece (16) for each combustor. The exit piece may include a straight path segment (26) for receiving a gas flow from a respective combustor. A straight ceramic liner (40) may be inwardly disposed onto a metal outer shell (38) along the straight path segment of the exit piece. Structural arrangements are provided to securely attach the ceramic liner in the presence of substantial flow path pressurization. Cost-effective serviceability of the transition duct systems is realizable since the liner can be readily removed and replaced as needed.

17 Claims, 8 Drawing Sheets

(56) References Cited

U.S. PATENT DOCUMENTS

2014/0338304 A1* 11/2014 Schilp .................... F01D 9/023
                                                                            60/39.23
2015/0198054 A1   7/2015 Charron et al.
2016/0186997 A1* 6/2016 Sadil ........................ F02C 7/24
                                                                            60/772

* cited by examiner

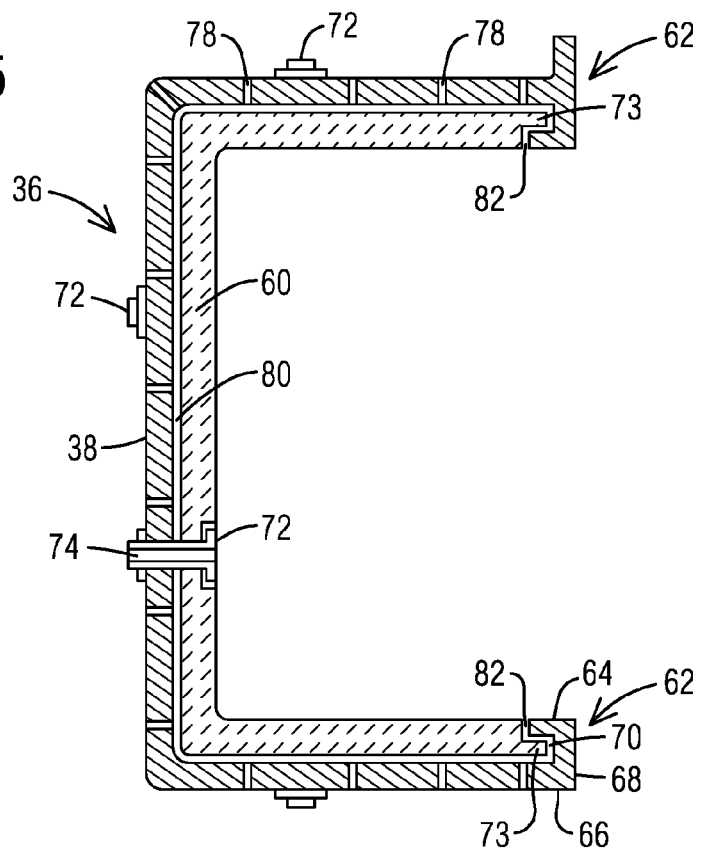
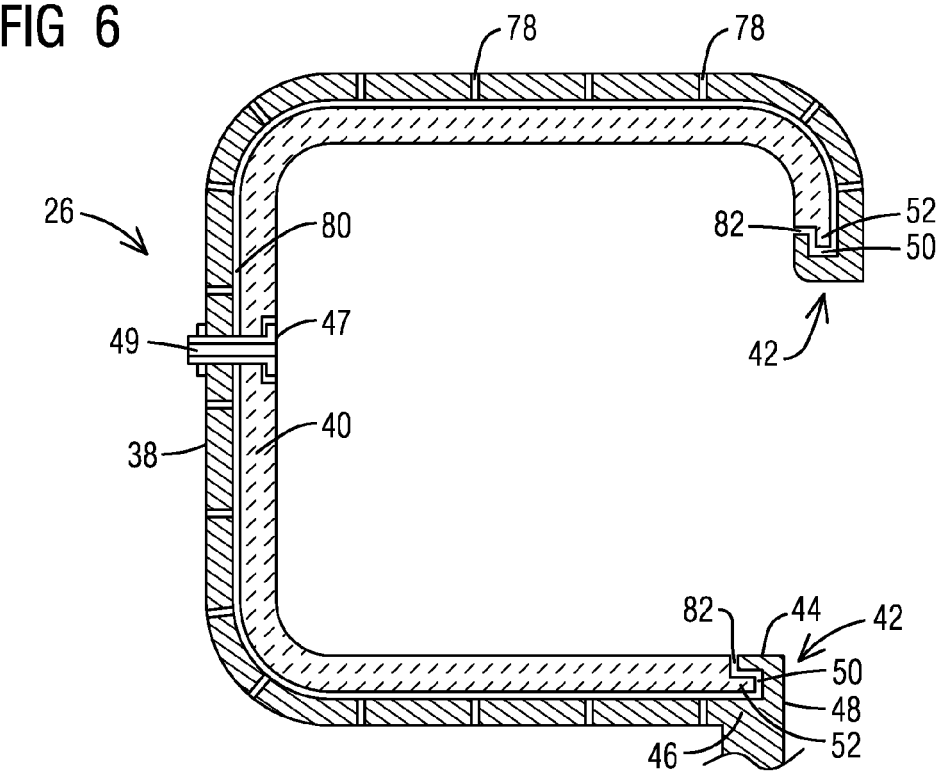

TRANSITION DUCT SYSTEM WITH STRAIGHT CERAMIC LINER FOR DELIVERING HOT-TEMPERATURE GASES IN A COMBUSTION TURBINE ENGINE

STATEMENT REGARDING FEDERALLY SPONSORED DEVELOPMENT

Development for this invention was supported in part by Contract No. DE-FE0023955, awarded by the United States Department of Energy. Accordingly, the United States Government may have certain rights in this invention.

CROSS-REFERENCE TO RELATED APPLICATIONS

The present application is related to U.S. patent application Ser. Nos. 15/002,437 and 15/002,456 respectively titled "Transition Duct System With Arcuate Ceramic Liner For Delivering Hot-Temperature Gases In A Combustion Turbine Engine" and "Transition Duct System With Metal Liners For Delivering Hot-Temperature Gases In A Combustion Turbine Engine", each filed concurrently herewith and incorporated by reference in their entirety.

FIELD OF THE INVENTION

Disclosed embodiments relate in general to a combustion turbine engine, such as a gas turbine engine, and, more particularly, to a transition duct system in the combustor section of the engine.

BACKGROUND OF THE INVENTION

Disclosed embodiments may be suited for a transition duct system configured so that a first stage of stationary airfoils (vanes) in the turbine section of the engine is eliminated, and where the hot working gases exiting the transition duct are conveyed directly to a row of rotating airfoils (blades) with high tangential velocity. In such cases, the transition duct system accomplishes the task of redirecting the gases, which would otherwise have been accomplished by a first row of turbine vanes. One example of a transition duct system having such a configuration is described in U.S. Pat. No. 8,276,389, which is incorporated herein by reference in its entirety.

BRIEF DESCRIPTION OF THE DRAWINGS

The invention is explained in the following description in view of the drawings that show:

FIG. 5 is a cross-sectional view along line V-V in FIG. 3 in connection with an arcuate ceramic liner.

FIG. 6 is a cross-sectional view along line VI-VI in FIG. 3 in connection with a straight ceramic liner.

DETAILED DESCRIPTION OF THE INVENTION

Figure 1:
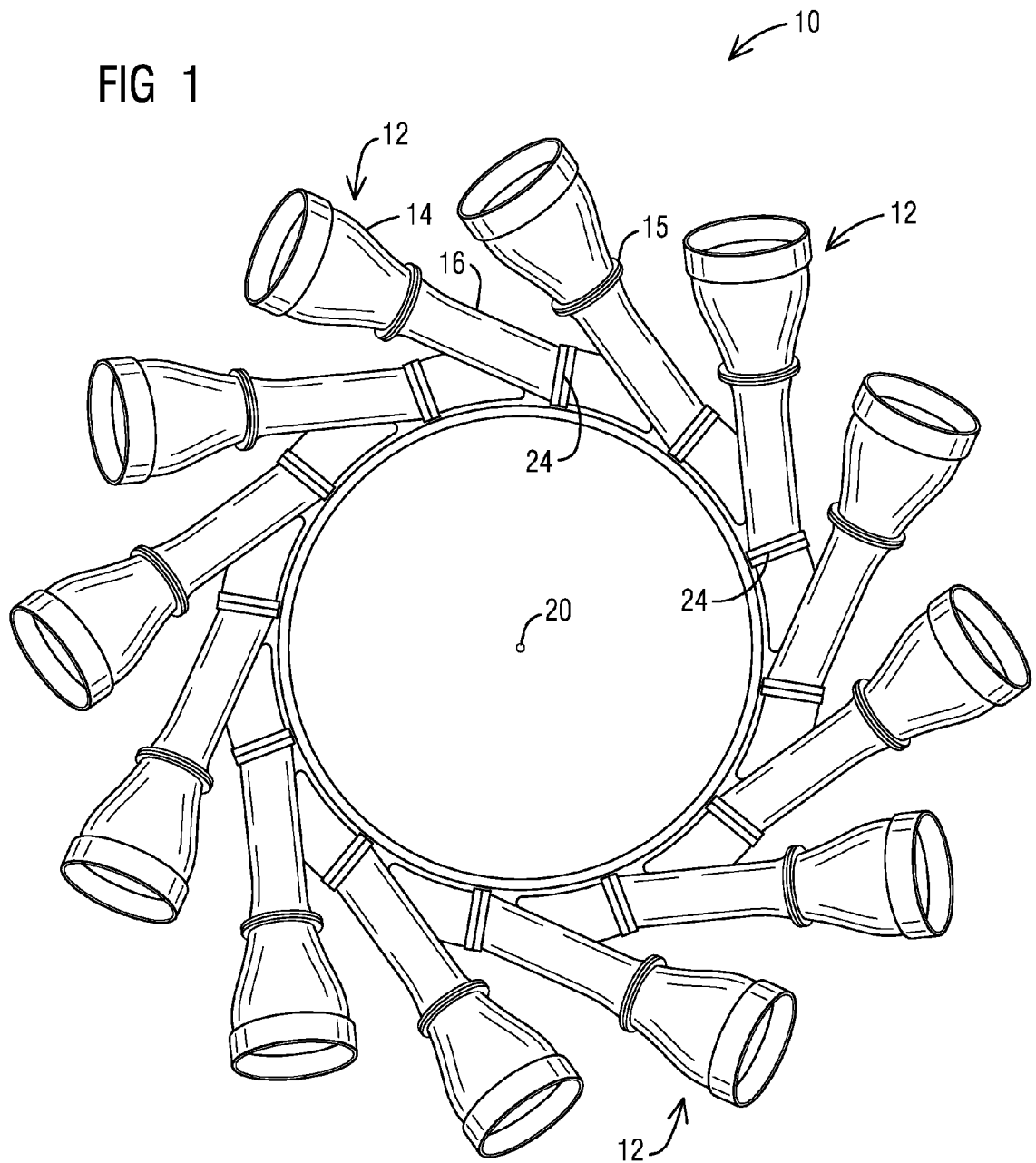
FIG. 1 is an upstream view of one non-limiting embodiment of a transition duct system for delivering hot-temperature gases from a plurality of combustors in a combustion turbine engine to a first row of turbine blades in the combustion turbine engine.

The present inventor has recognized that certain known transition duct systems tend to consume a substantial amount of cooling air in view of the hot-temperature gases directed by such a system. This can reduce the efficiency of the gas turbine engine and can lead to increased generation of NOx emissions. In view of such a recognition, the present inventor proposes innovative structural arrangements in a transition duct system that in a reliable and cost-effective manner can be used to securely attach a thermal insulating liner, such as may comprise a suitable ceramic or metal material, in the presence of a substantial flow path pressurization, as may develop in the high Mach (M) number regions of the system (e.g., approaching approximately 0.8 M). Moreover, the proposed structural arrangement is designed to accommodate thermal growth differences that may develop between the thermal insulating liner and a metal outer shell onto which the liner is disposed. Lastly, the proposed structural arrangement is designed to improve cost-effective serviceability of the transition duct systems since disclosed thermal insulating liners can be readily removed and replaced as needed.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

FIG. 1 is an upstream view of one non-limiting embodiment of a transition duct system 10 for delivering hot-temperature gases from a plurality of combustors in a combustion turbine engine to a first row of turbine blades in the combustion turbine engine. As referred to herein, an upstream view means looking from upstream toward downstream along a longitudinal axis 20 of the gas turbine engine, and a downstream view, as shown in FIG. 2, means the opposite.

Figure 2:
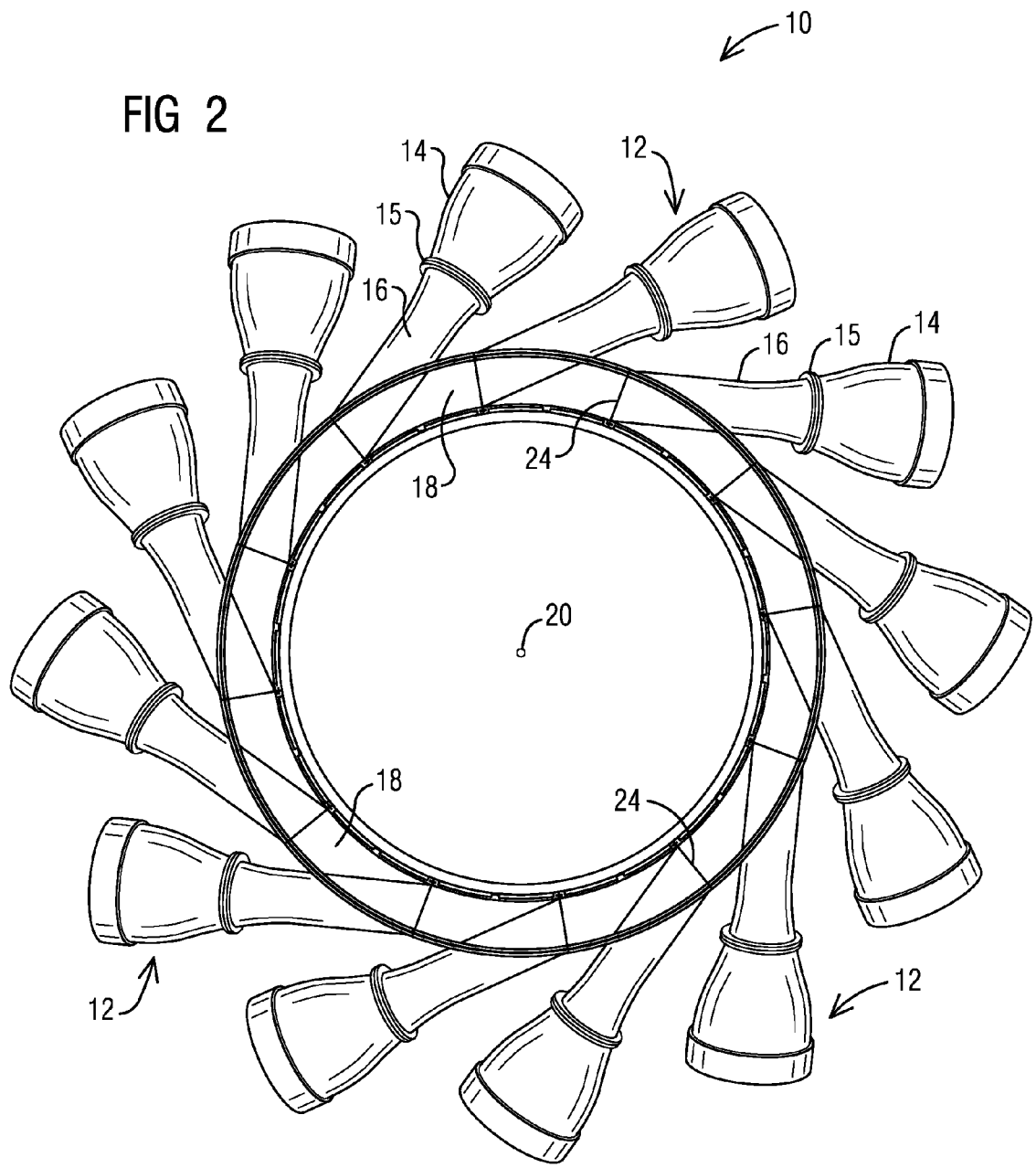
FIG. 2 is a downstream view of the transition duct system shown in FIG. 1.

As can be appreciated in FIGS. 1 and 2, transition duct system 10 is composed of multiple sets of flow directing structures 12. There is a flow directing structure 12 for each combustor (not shown). Combustion gases from each combustor flow into a respective flow directing structure 12. Each flow directing structure may include a flow-accelerating cone 14 and an exit piece 16. The exit pieces 16 in combination form an annular chamber 18, which is illustrated in FIG. 2.

Each gas flow from a respective exit piece 16 enters annular chamber 18 at respective circumferential locations. Each gas flow originates in its respective combustor can and is directed as a discrete flow to the annular chamber 18. Each exit piece 16 abuts adjacent annular chamber ends at exit piece joints 24. Annular chamber 18 is arranged to extend circumferentially and oriented concentric to longitudinal axis 20 for delivering the gas flow to the first row of blades (not shown), which would be disposed immediately downstream of annular chamber 18.

Figure 3:
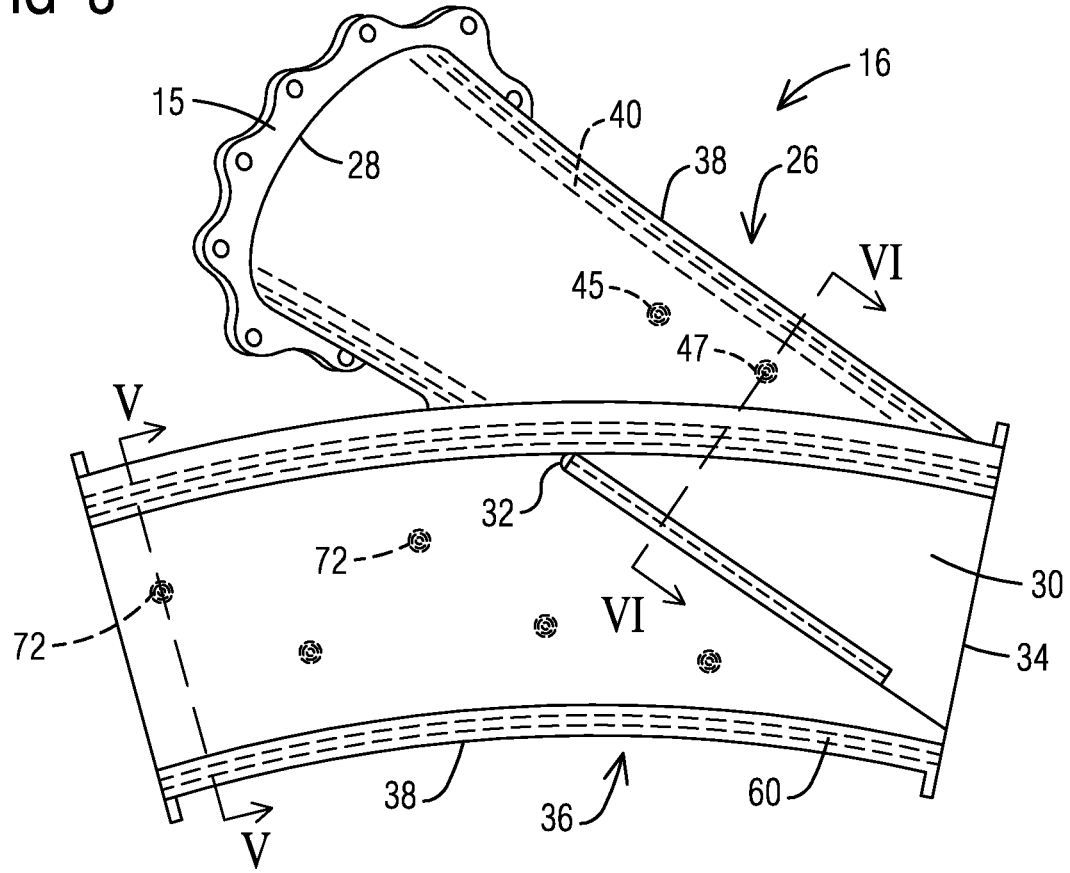
FIG. 3 is an isometric view of one non-limiting embodiment of a respective exit piece used in the transition duct system for delivering hot-temperature gases.

FIG. 3 is an isometric view of a respective exit piece 16. In one non-limiting embodiment, each exit piece includes a straight path segment 26 (e.g., not generally curved) for receiving a gas flow from a respective combustor (not shown). Each straight path segment 26 forms a closed perimeter starting at an inlet end 28 of straight path segment 26. In one non-limiting embodiment, the closed perimeter of the straight path segment of exit piece 16 changes to an open perimeter 30 that is in fluid communication with a corresponding portion of annular chamber 18 along a common plane between a convergence flow junction (CFJ) 32 and an outlet end 34 of straight path segment 26. A closed perimeter refers to a closed contour or outline formed by the sides of a given structure (e.g., the sides of the straight path segment 26), whereas an open perimeter refers to an unclosed contour or outline formed by the sides of the given structure.

Each exit piece 16 may further include an arcuate connection segment 36 that forms an open perimeter. Each respective exit piece 16 connects at joint 24 (FIG. 2) to an adjacent exit piece at the connection segment of the adjacent exit piece, and the connected exit pieces define annular chamber 18.

In one non-limiting embodiment, exit piece 16 may comprise a metal outer shell 38 and a straight ceramic liner 40 (as may be appreciated in FIG. 6), such as a ceramic matrix composite (CMC), inwardly disposed onto metal outer shell 38. In this embodiment, straight ceramic liner 40 forms a closed liner perimeter that changes to an open liner perimeter respectively in correspondence with the closed perimeter and the open perimeter of the straight path segment 26 of the exit piece. In one non-limiting embodiment, the closed liner perimeter of straight ceramic liner 40 starting at inlet end 28 of the straight path segment 26 has a circular shape. This circular shape changes to a polygonal shape further downstream from the inlet end of the straight path segment 26.

Figure 4:
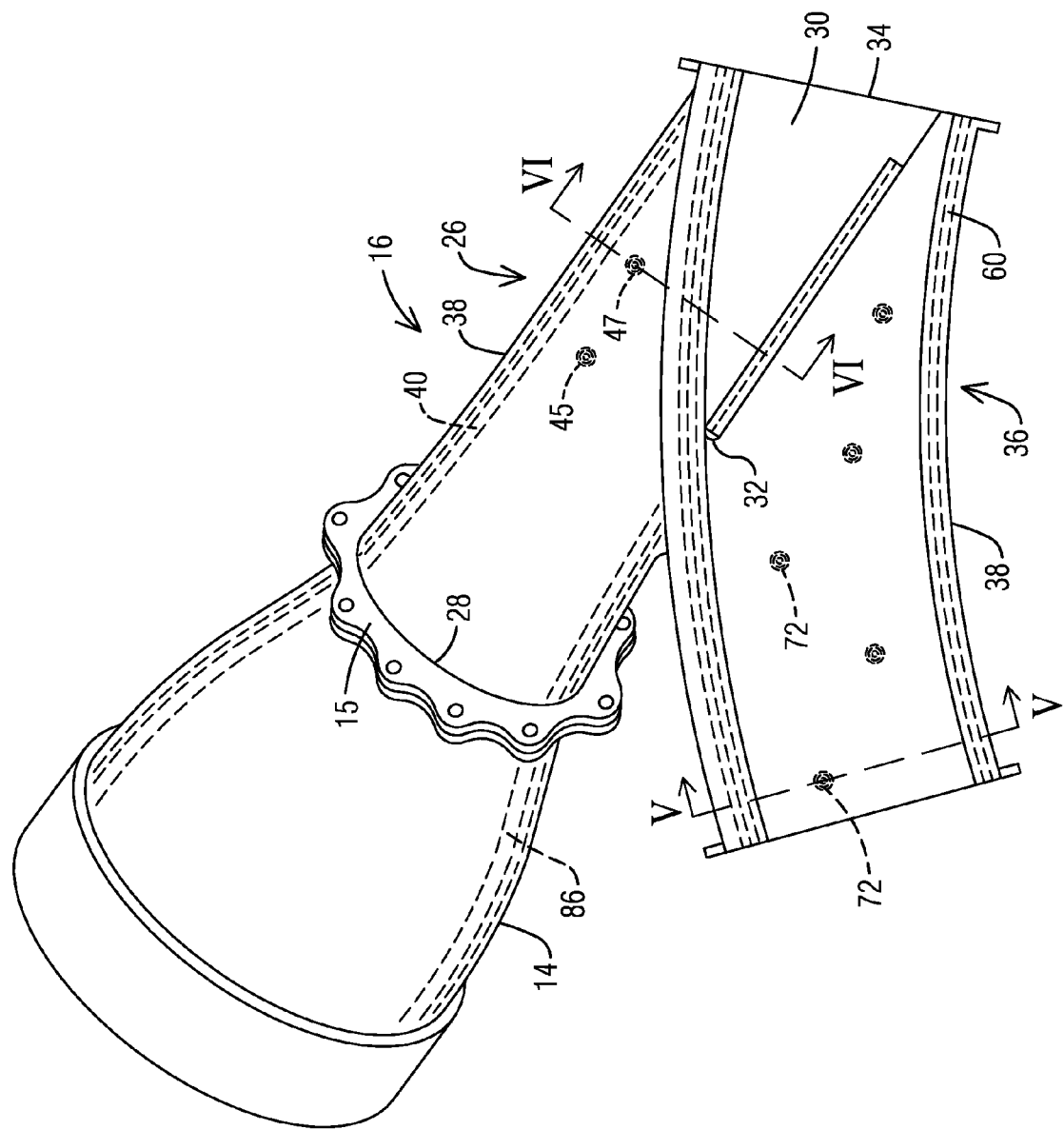
FIG. 4 is an isometric view of another non-limiting embodiment of the exit piece.

As may be appreciated in FIG. 4, flow-accelerating cone 14 may be connected by way of a flange joint 15 to inlet end 28 of the straight path segment 26 of exit piece 16. In one non-limiting embodiment, straight ceramic liner 40 transitions to a conical liner 86 extending upstream of flange joint 15 into flow-accelerating cone 14.

In one non-limiting embodiment, respective retainer structures 42 (FIG. 6) nay be disposed at respective edges of the open perimeter of the straight path segment 26 of exit piece 16 to retain respective edges of the open liner perimeter in the straight path segment of the exit piece.

In one non-limiting embodiment, each retainer structure 42 may be formed by a body comprising a first flange 44 and a second flange 46 interconnected by a web 48. The body of retainer structure 42 has a lengthwise dimension extending along a longitudinal axis of the straight path segment of the exit piece. First and second flanges 44, 46 that are interconnected by web 48 define a groove 50 configured to receive a corresponding ceramic liner protrusion 52 at a respective edge of the open liner perimeter in the straight path segment 26 of the exit piece.

In one non-limiting embodiment, a first set of fasteners 45 (one such fastener is shown in FIG. 3) may be used to affix the straight ceramic liner 40 to the metal outer shell over an area enconmpassed by the closed perimeter of the straight path segment 26 of the exit piece. Additionally, a second set of fasteners 47 may be disposed between the respective retainer structures 42 to fasten the straight ceramic liner 40 to the metal outer shell over an area between the edges of the open perimeter of the straight path segment of the exit piece. As may be appreciated in FIG. 6 in connection with fastener 47, these fasteners may comprise respective cooling conduits 49 extending along respective longitudinal axes of the first and a second set of fasteners.

In one non-limiting embodiment, as may be further appreciated in FIG. 5, arcuate connecting segment 36 of exit piece 16 may include a respective arcuate ceramic liner 60, such as may comprise a CMC, inwardly disposed onto metal outer shell 38 along the arcuate connecting segment 36 of exit piece 16. In this embodiment, arcuate ceramic liner 60 forms an open liner perimeter in correspondence with the open perimeter of the arcuate connection segment 36 of the exit piece. Straight ceramic liner 40 and arcuate ceramic liner 60 may respectively include two-dimensional or three-dimensional weaves of reinforcing fibers, (or combinations of such weaves of reinforcing fibers) to provide a desired performance in a given application.

In one non-limiting embodiment, respective retainer structures 62 may be disposed in the arcuate connecting segment 36 of the exit piece to retain respective edges of the open liner perimeter in the arcuate connecting segment 36 of the exit piece. In one non-limiting embodiment, similar to retainer structures 42 described above in connection with straight segment 26, each retainer structure 62 may be formed by a body comprising a first flange 64 and a second flange 66 interconnected by a web 68. In this embodiment, the body of retainer structures 62 is arranged to circumferentially extend in the arcuate connection segment 36 of the exit piece. First and second flanges 64, 66 that are interconnected by web 68 define a groove 70 configured to receive a corresponding ceramic liner protrusion 73 at a respective edge of the open liner perimeter in the arcuate connection segment 36 of the exit piece.

Fasteners 72 may be disposed between the respective retainer structures 62 to fasten arcuate ceramic liner 60 to the metal outer shell over an area between the edges of the open perimeter of the arcuate connection segment of the exit piece. As noted above in connection with fasteners 45, 47 for fastening straight ceramic liner 40, fasteners 72 may also include respective cooling conduits 74 (FIG. 5) extending along respective longitudinal axes of fasteners 72.

As may be appreciated in FIGS. 5 and 6, metal outer shell 38 includes impingement cooling orifices 78 to receive cooling air. Metal outer shell 38 and respective ceramic liners 40, 60 may each be arranged to form respective gaps 80 between one another effective to form a flow of the cooling air. Respective retainer structures 42, 62 may be configured to form respective spacings 82 with respect to the respective edges of ceramic liner protrusions 52, 73 effective to discharge the flow of the cooling air.

Figure 7:
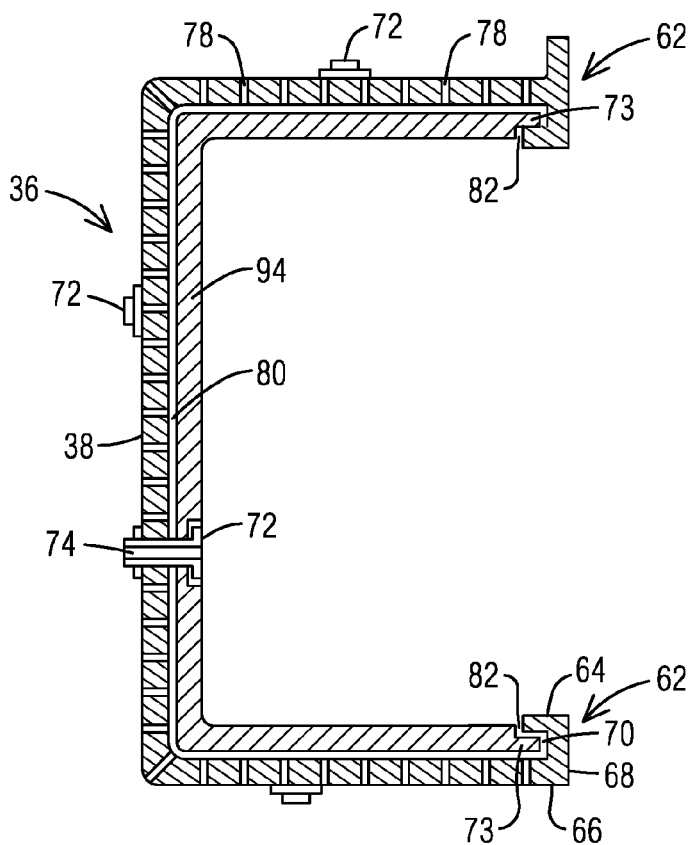
FIGS. 7 and 8 are respective cross-sectional views in connection with a non-limiting embodiment involving respective metal liners.
Figure 8:
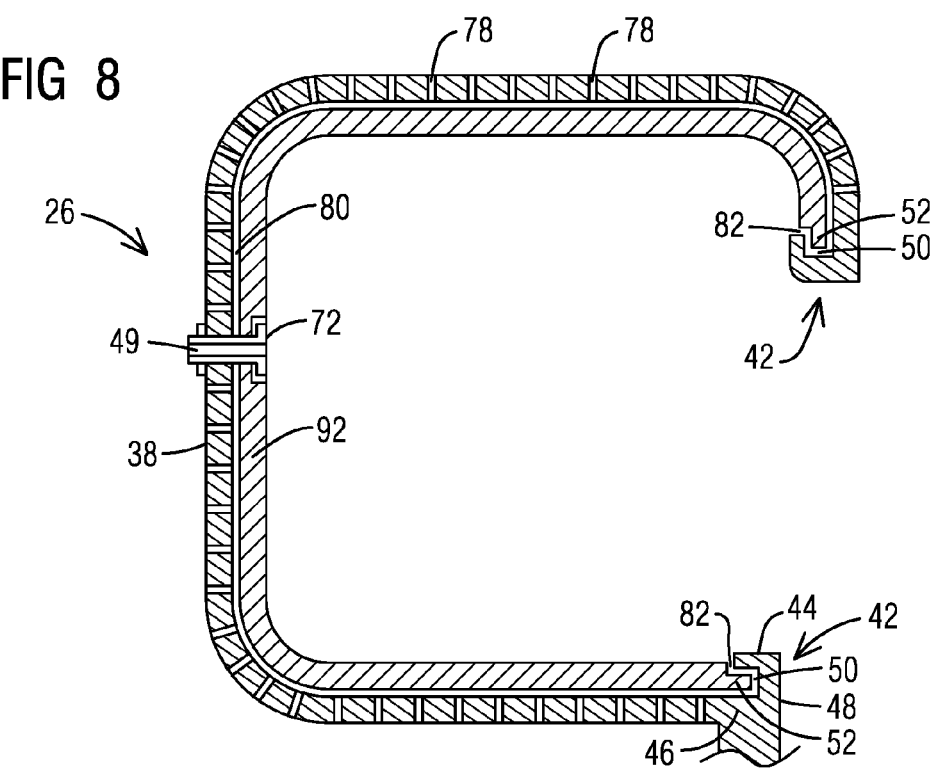

In one non-limiting embodiment, in lieu of straight ceramic liner 40 and arcuate ceramic liner 60, one could use a straight metal liner 92 and an arcuate metal liner 94, as may be respectively appreciated in FIGS. 8 and 7. That is, one could use non-ceramic liners. The structural means for securing metal liners 92 and 94 to metal outer shell 38, such as the retainer structures and fasteners, can be as functionally described above in the context of FIGS. 3-6, and will not be repeated here for the sake of avoiding burdensome and unnecessary repetition. This embodiment provides flexibility to the designer since, for example, metal liners 92 and 94 may be chosen to have different thermal resistance properties. For example, such liners could be made of a high temperature metal, such as without limitation, a nickel superalloy, CM 247 LC alloy, IN-939 alloy, etc., whereas metal outer shell 38 could be made of a relatively less costly material, such as such as without limitation, Hastelloy X, Inconel alloy 625, etc. Additionally, the proposed structural arrangement is designed to improve cost-effective serviceability of the transition duct systems since disclosed thermal insulating liners (whether made from metal or ceramic) can be readily removed and replaced as needed.

Figure 9:
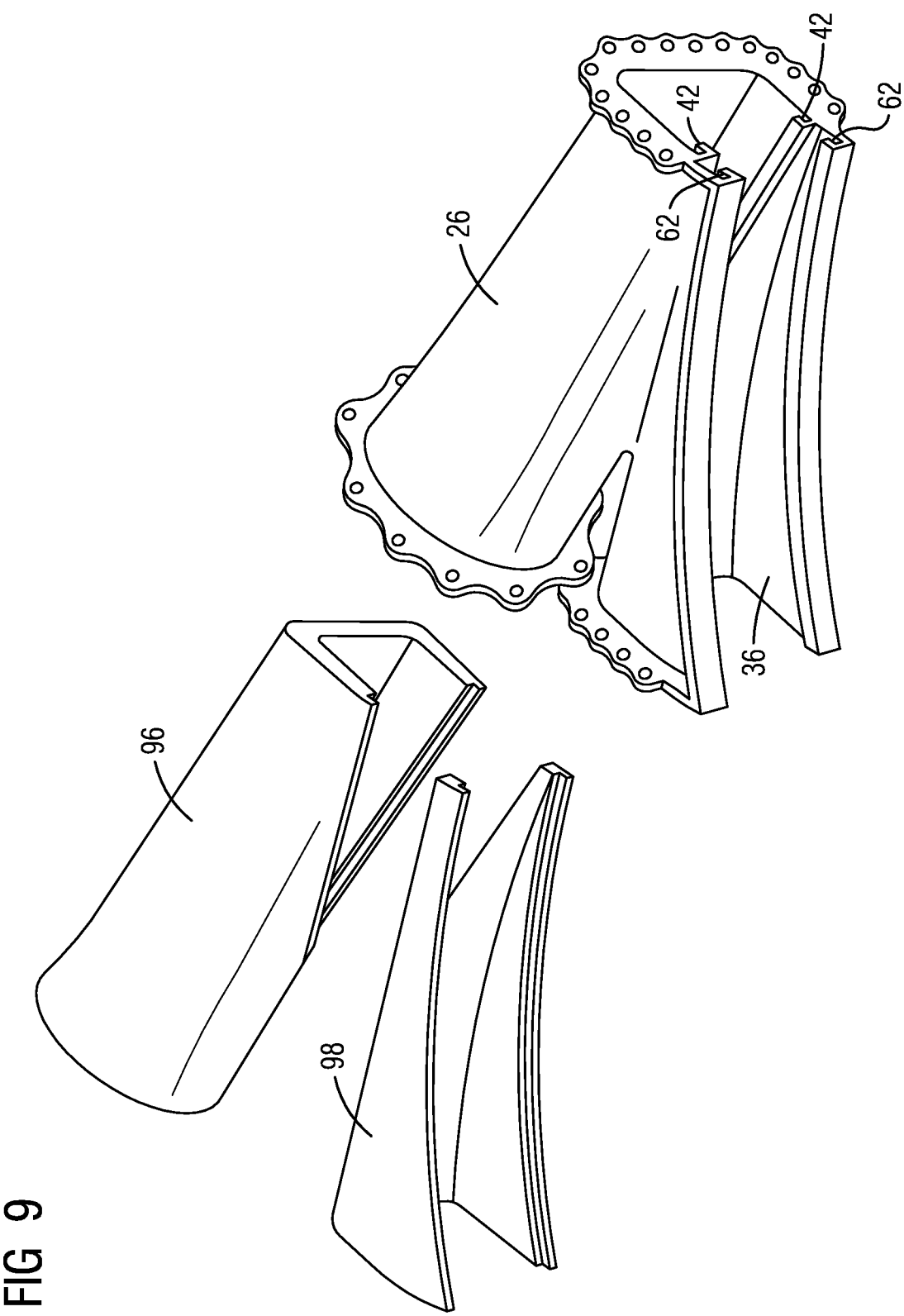
FIG. 9 is an exploded isometric of one non-limiting embodiment of a thermally-insulating liner (e.g., ceramic or metal liner) including a straight path segment and an arcuate connecting segment prior to assembly into the exit piece, where such segments comprise separate structures.
Figure 10:
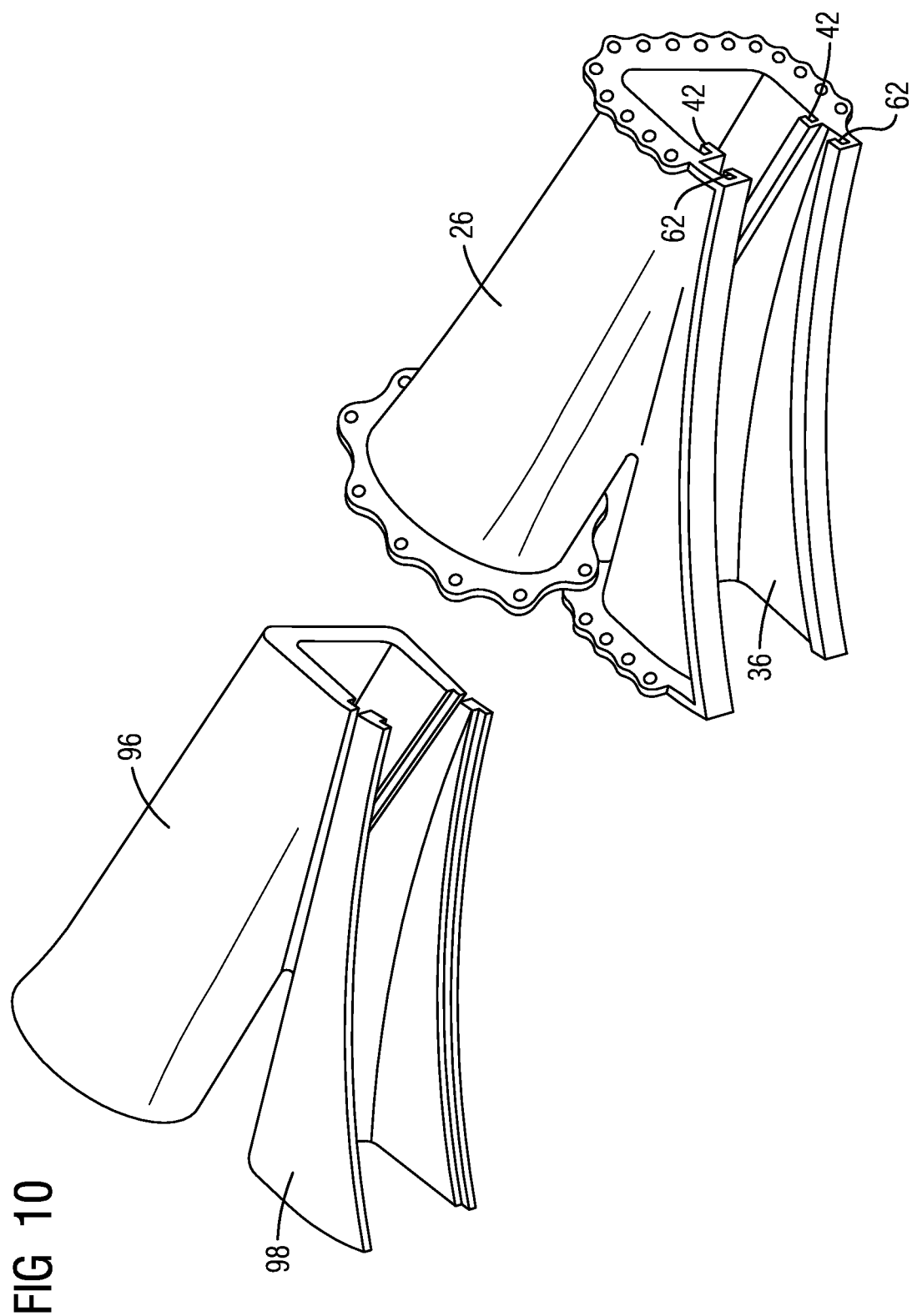
FIG. 10 is an exploded isometric of one non-limiting embodiment of a thermally-insulating liner (e.g., ceramic or metal liner) including a straight path segment and an arcuate connecting segment prior to assembly into the exit piece, where such segments comprise a singular structure.

As may be appreciated in FIGS. 9 and 10, straight liner 96 and arcuate liner 98 (whether made from ceramic or metal) may respectively comprise discrete structures (FIG. 9) or may comprise an integral structure (FIG. 10).

In operation, disclosed embodiments reduce the amount of cooling air that may be needed to cool the transition duct system. This improves the efficiency of the gas turbine engine and can lead to reduced generation of NOx emissions. Disclosed embodiments are effective to securely attach a thermal insulating liner, such as may comprise a suitable ceramic or metal material, in the presence of a substantial flow path pressure, as may develop in the high Mach (M) number regions of the system. Moreover, disclosed embodiments effectively accommodate thermal growth differences that may develop between the thermal insulating liner and a metal outer shell onto which the liner is disposed.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A transition duct system for delivering hot-temperature gases from a plurality of combustors in a combustion turbine engine to a first row of turbine blades in the combustion turbine engine, the transition duct system comprising:
    an exit piece for each combustor, wherein each exit piece comprises a straight path segment for receiving a gas flow from a respective combustor,
    wherein each straight path segment forms a closed perimeter starting at an inlet end of the straight path segment,
    wherein the closed perimeter of the straight path segment of the exit piece changes to an open perimeter that is in fluid communication with a corresponding portion of an annular chamber along a common plane between a convergence flow junction (CFJ) and an outlet end of the straight path segment, and
    the exit piece comprising:
        a metal outer shell and a straight ceramic liner inwardly disposed onto the metal outer shell along the straight path segment of the exit piece, wherein the straight ceramic liner forms a closed liner perimeter and an open liner perimeter respectively in correspondence with the closed perimeter and the open perimeter of the straight path segment of the exit piece; and
    respective retainer structures disposed in the straight path segment of the exit piece to retain respective edges of the open liner perimeter in the straight path segment of the exit piece,
    wherein the respective retainer structures are disposed at respective edges of the open perimeter of the straight path segment of the exit piece,
    wherein each retainer structure comprises a body comprising a first flange and a second flange interconnected by a web, the body having a lengthwise dimension extending along a longitudinal axis of the straight path segment of the exit piece,
    wherein the first and second flanges interconnected by the web define a groove configured to receive a corresponding ceramic liner protrusion at a respective edge of the open liner perimeter in the straight path segment of the exit piece.

2. The transition duct system of claim 1, wherein each exit piece further comprises an arcuate connection segment, wherein each arcuate connection segment forms an open perimeter, wherein each exit piece connects to an adjacent exit piece at the arcuate connection segment of the adjacent exit piece, and the connected exit pieces define the annular chamber, the annular chamber arranged to extend circumferentially and oriented concentric to a longitudinal axis of the combustion turbine engine, for delivering the gas flow to the first row of blades.

3. The transition duct system of claim 2, wherein an arcuate ceramic liner is inwardly disposed onto the metal outer shell along the arcuate connection segment of the exit piece, wherein the arcuate ceramic liner forms an open liner perimeter in correspondence with the open perimeter of the arcuate connection segment of the exit piece.

4. The transition duct system of claim 3, further comprising respective retainer structures disposed in an arcuate connecting segment of the exit piece to retain respective edges of the open liner perimeter in the arcuate connecting segment of the exit piece.

5. The transition duct system of claim 3, wherein the straight ceramic liner and the arcuate ceramic liner respectively comprise a ceramic matrix composite.

6. The transition duct system of claim 1, further comprising a first set of fasteners to affix the straight ceramic liner to the metal outer shell over an area bounded by the closed perimeter of the straight path segment of the exit piece.

7. The transition duct system of claim 6, further comprising a second set of fasteners disposed between the respective retainer structures to fasten the straight ceramic liner to the metal outer shell over an area between the edges of the open perimeter of the straight path segment of the exit piece.

8. The transition duct system of claim 7, wherein the first and second sets of fasteners comprise respective cooling conduits extending along respective longitudinal axes of the first and a second set of fasteners.

9. The transition duct system of claim 1 wherein the metal outer shell comprises impingement cooling orifices to receive cooling air, wherein the metal outer shell and the straight ceramic liner are arranged to form a gap between one another effective to pass a flow of the cooling air.

10. The transition duct system of claim 9, wherein the respective retainer structures are configured to form a spacing with respect to a ceramic liner protrusion at a respective edge of the open liner perimeter in the straight path segment of the exit piece, the spacing effective to discharge the flow of the cooling air.

11. The transition duct system of claim 1, wherein the closed liner perimeter starting at the inlet end of the straight path segment comprises a circular shape.

12. The transition duct system of claim 11, wherein the circular shape changes to a polygonal shape further downstream from the inlet end of the straight path segment.

13. The transition duct system of claim 1, further comprising a flow-accelerating cone connected by way of a flange joint to the inlet end of the straight path segment of the exit piece, wherein the straight ceramic liner transitions to a conical liner extending upstream of the flange joint into the flow-accelerating cone.

14. A transition duct system for delivering hot-temperature gases from a plurality of combustors in a combustion turbine engine to a first row of turbine blades in the combustion turbine engine, the transition duct system comprising:
   an exit piece for each combustor, wherein each exit piece comprises a straight path segment for receiving a gas flow from a respective combustor,
   wherein each straight path segment forms a closed perimeter starting at an inlet end of the straight path segment,
   wherein the closed perimeter of the straight path segment of the exit piece changes to an open perimeter that is in fluid communication with a corresponding portion of an annular chamber along a common plane between a convergence flow junction (CFJ) and an outlet end of the straight path segment, and
   the exit piece comprising:
   a metal outer shell and a straight ceramic liner inwardly disposed onto the metal outer shell at least along the straight path segment of the exit piece, wherein the straight ceramic liner forms a closed liner perimeter and an open liner perimeter respectively in correspondence with the closed perimeter and the open perimeter of the straight path segment of the exit piece;
   respective retainer structures disposed in the straight path segment of the exit piece to retain respective edges of the open liner perimeter in the straight path segment of the exit piece, wherein each retainer structure comprises a body comprising a first flange and a second flange interconnected by a web, the body having a lengthwise dimension extending along a longitudinal axis of the straight path segment of the exit piece, wherein the first and second flanges interconnected by the web define a groove configured to receive a corresponding ceramic liner protrusion at a respective edge of the open liner perimeter in the straight path segment of the exit piece; and
   fasteners to affix the straight ceramic liner to the metal outer shell over an area bounded by the closed perimeter of the straight path segment of the exit piece.

15. The transition duct system of claim 14, wherein each exit piece further comprises an arcuate connection segment, wherein each arcuate connection segment forms an open perimeter, wherein each exit piece connects to an adjacent exit piece at the arcuate connection segment of the adjacent exit piece, and the connected exit pieces define the annular chamber, wherein an arcuate ceramic liner is inwardly disposed onto the metal outer shell along the arcuate connection segment of the exit piece, wherein the arcuate ceramic liner forms an open liner perimeter in correspondence with an open perimeter of the arcuate connection segment of the exit piece.

16. The transition duct system of claim 15, further comprising respective retainer structures disposed in an arcuate connecting segment of the exit piece to retain respective edges of the open liner perimeter in the arcuate connecting segment of the exit piece.

17. The transition duct system of claim 14, wherein the straight ceramic liner and the arcuate ceramic liner comprises a ceramic matrix composite.

\* \* \* \* \*